(12) United States Patent
Guen

(10) Patent No.: US 9,263,723 B2
(45) Date of Patent: Feb. 16, 2016

(54) SECONDARY BATTERY HAVING A COLLECTING PLATE

(75) Inventor: Minhyung Guen, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 357 days.

(21) Appl. No.: 13/040,174

(22) Filed: Mar. 3, 2011

(65) Prior Publication Data

US 2012/0164501 A1    Jun. 28, 2012

(30) Foreign Application Priority Data

Dec. 24, 2010 (KR) .................. 10-2010-0134511

(51) Int. Cl.
*H01M 2/26* (2006.01)
(52) U.S. Cl.
CPC ..................................... *H01M 2/263* (2013.01)
(58) Field of Classification Search
USPC .......................................................... 429/179
See application file for complete search history.

(56) References Cited

U.S. PATENT DOCUMENTS

| | | | |
|---|---|---|---|
| 2003/0129479 A1* | 7/2003 | Munenaga et al. | 429/94 |
| 2006/0051664 A1* | 3/2006 | Tasai et al. | 429/161 |
| 2007/0009793 A1 | 1/2007 | Kim et al. | |
| 2007/0117009 A1* | 5/2007 | Yamauchi et al. | 429/160 |

FOREIGN PATENT DOCUMENTS

| | | |
|---|---|---|
| JP | 11-312509 | 11/1999 |
| JP | 2000-223109 | 8/2000 |
| JP | 2003-173765 | 6/2003 |
| JP | 2007-019017 | 1/2007 |
| KR | 10-0637443 B1 | 10/2006 |

OTHER PUBLICATIONS

KIPO Office Action dated May 23, 2012 issued to corresponding KR Patent Application No. 10-2010-0134511 (4 pages).
Machine English Translation of JP 11-312509, 1999.
Machine English Translation of JP 2000-223109, 2000.

* cited by examiner

*Primary Examiner* — Patrick Ryan
*Assistant Examiner* — Lucas J O'Donnell
(74) *Attorney, Agent, or Firm* — Lewis Roca Rothgerber Christie LLP

(57) ABSTRACT

A secondary battery includes a wound electrode assembly having a first electrode plate having a non-coating portion, a second electrode plate having a non-coating portion, and a separator between the first electrode plate and the second electrode plate; a collecting plate having a track accommodating and electrically coupled to the non-coating portion of one of the electrode plates; a case housing the electrode assembly and the collecting plate, the case comprising an upper opening; and a cap assembly sealing the upper opening of the case.

14 Claims, 7 Drawing Sheets

SECONDARY BATTERY HAVING A COLLECTING PLATE

CROSS-REFERENCE TO RELATED APPLICATION

This application claims priority to and the benefit of Korean Patent Application No. 10-2010-0134511, filed on Dec. 24, 2010, in the Korean Intellectual Property Office, the disclosure of which is incorporated herein in its entirety by reference.

BACKGROUND

1. Field

Embodiments relate to a secondary battery.

2. Description of the Related Art

Secondary batteries are rechargeable unlike primary batteries. Among such secondary batteries, a low capacity battery including a battery cell in the form of a pack may be used for small portable electronic devices such as cellular phones and camcorders, and a high capacity battery including dozens of battery cells connected to one another may be used as a motor-driving power source for electric scooters, hybrid vehicles, or electric vehicles.

Secondary batteries are manufactured in various shapes such as a cylindrical shape and a prismatic shape. A secondary battery is typically constructed as follows: an electrode assembly formed by inserting an insulating separator between a positive electrode plate and a negative electrode plate is placed in a case together with electrolyte, and a cap plate is placed on the case. The electrode assembly is connected to electrode terminals which protrude from the cap plate and are exposed to the exterior of the secondary battery.

SUMMARY

An aspect of the present invention provides a secondary battery in which the structure of a collecting plate is changed to reduce dead space and the size and weight of the secondary battery.

According to at least one embodiment, a secondary battery is provided including a wound electrode assembly having a first electrode plate having a non-coating portion, a second electrode plate having a non-coating portion, and a separator between the first electrode plate and the second electrode plate; a collecting plate having a track accommodating and electrically coupled to the non-coating portion of one of the electrode plates; a case housing the electrode assembly and the collecting plate, the case comprising an upper opening; and a cap assembly sealing the upper opening of the case.

In one embodiment, the non-coating portion includes a bonded section and a non-coating end. Additionally, in one embodiment, the collecting plate has a generally planar surface that faces the non-coating portion of one of the electrode plates. The collecting plate may include a base having a generally planar surface that faces the non-coating portion of one of the electrode plates; a first extension extending at substantially a right angle from an edge of the base; and a second extension extending at substantially a right angle from the first extension, wherein the first extension and the second extension form the track.

In one embodiment, the non-coating portion of one of the electrode plates is coupled to the second extension. Additionally, the collecting plate may also include a plurality of penetration holes that generally correspond to the non-coating portion of one of the electrode plates. In one embodiment, the collecting plate further includes an opening, and wherein an electrode terminal is in the opening and electrically coupled to the collecting plate.

In another embodiment, the electrode assembly includes two electrode assemblies oriented such that a planar surface of each of the two electrode assemblies face each other. The non-coating portion of the electrode plates of a first one of the electrode assemblies may be bent in a first direction and the non-coating portion of the electrode plates of a second one of the electrode assemblies may be bent in a second direction substantially opposite to the first direction.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
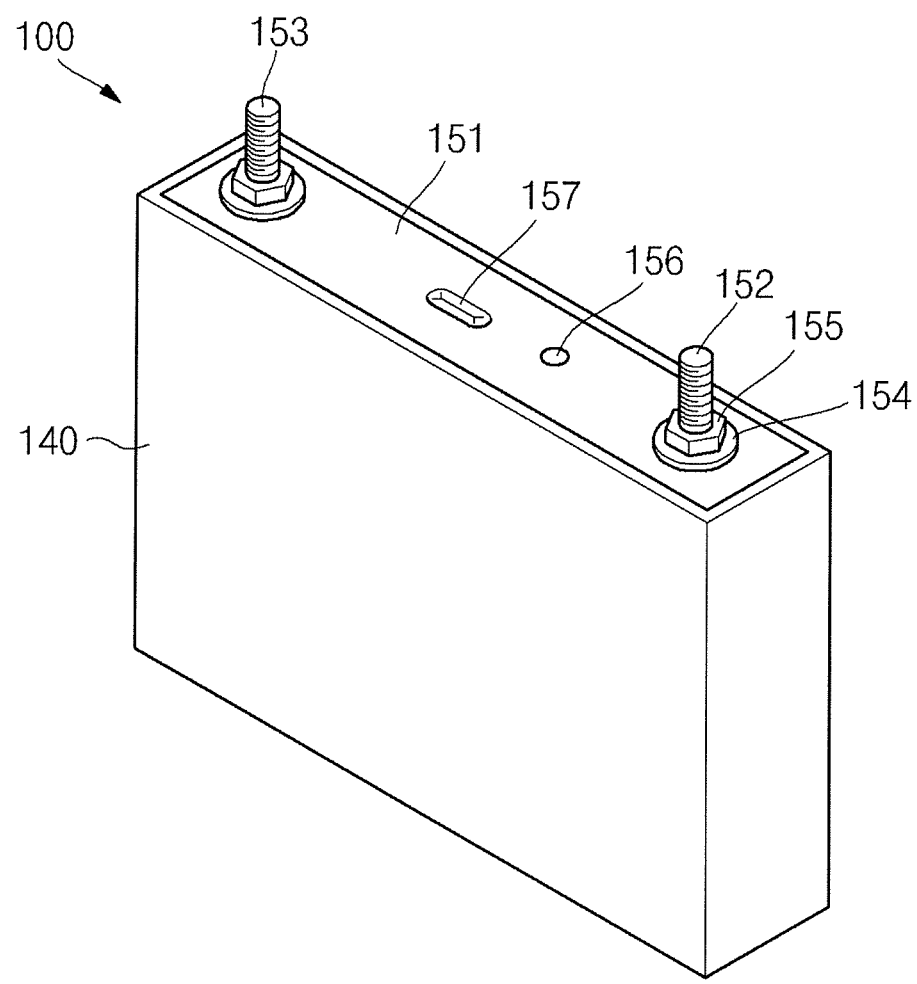
FIG. 1 is a perspective view illustrating a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the following description, like reference numerals designate elements having like functions and operations throughout. In addition, it will be understood that when a part is referred to as being electrically connected to another part, it can be directly connected to the other part, or intervening parts may also be present.

Figure 2:
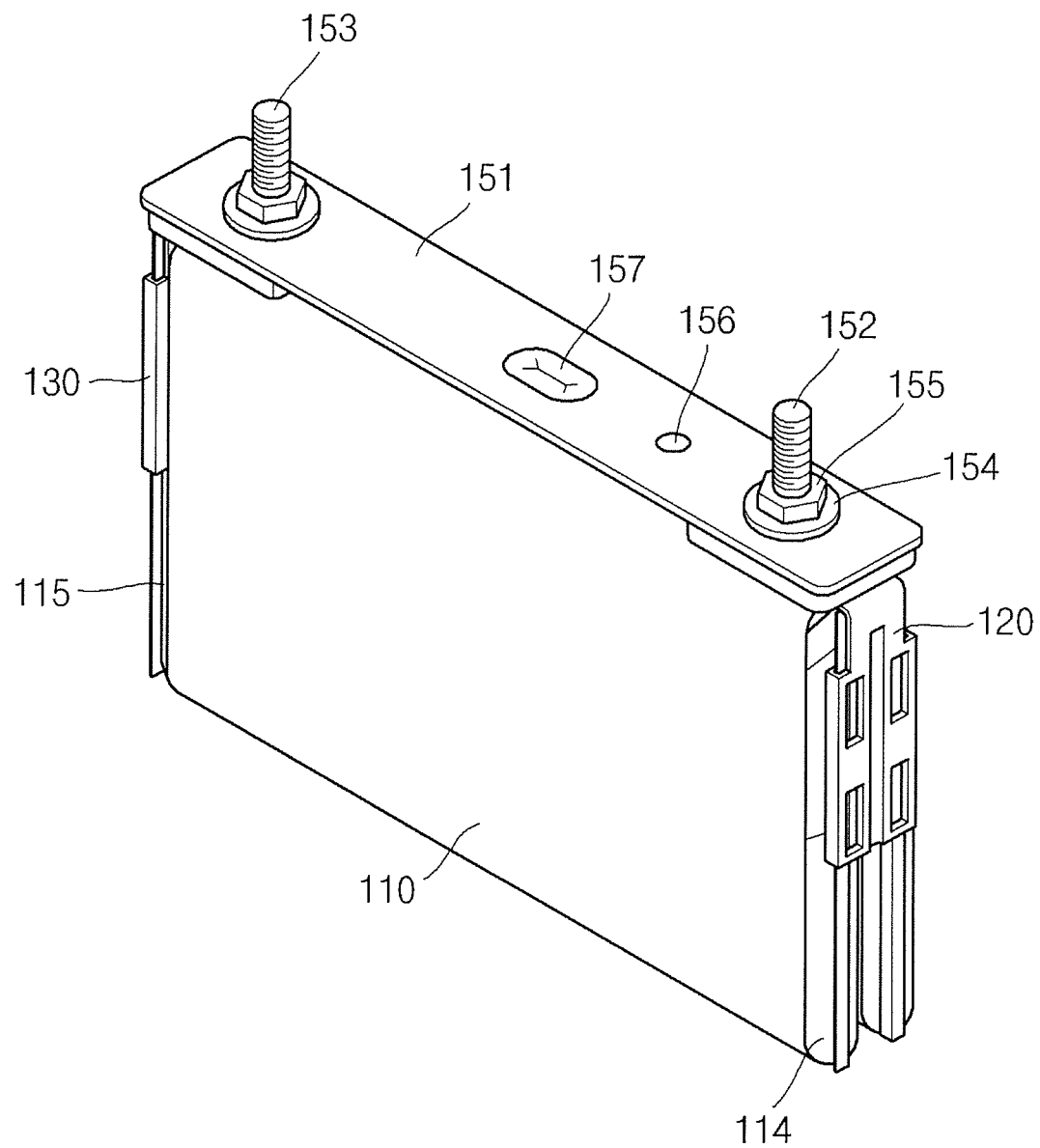
FIG. 2 is a perspective view illustrating the secondary battery of FIG. 1 after removing a case from the secondary battery.
Figure 3:
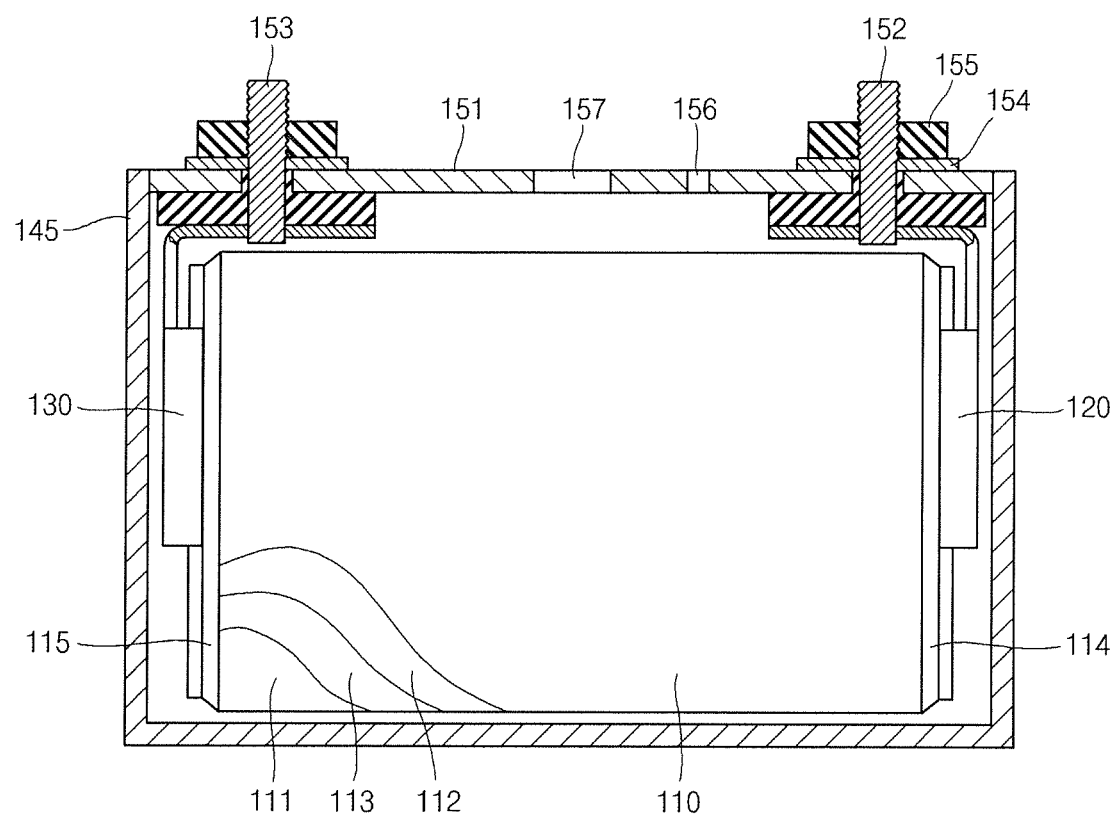
FIG. 3 is a sectional view of FIG. 1.
Figure 4:
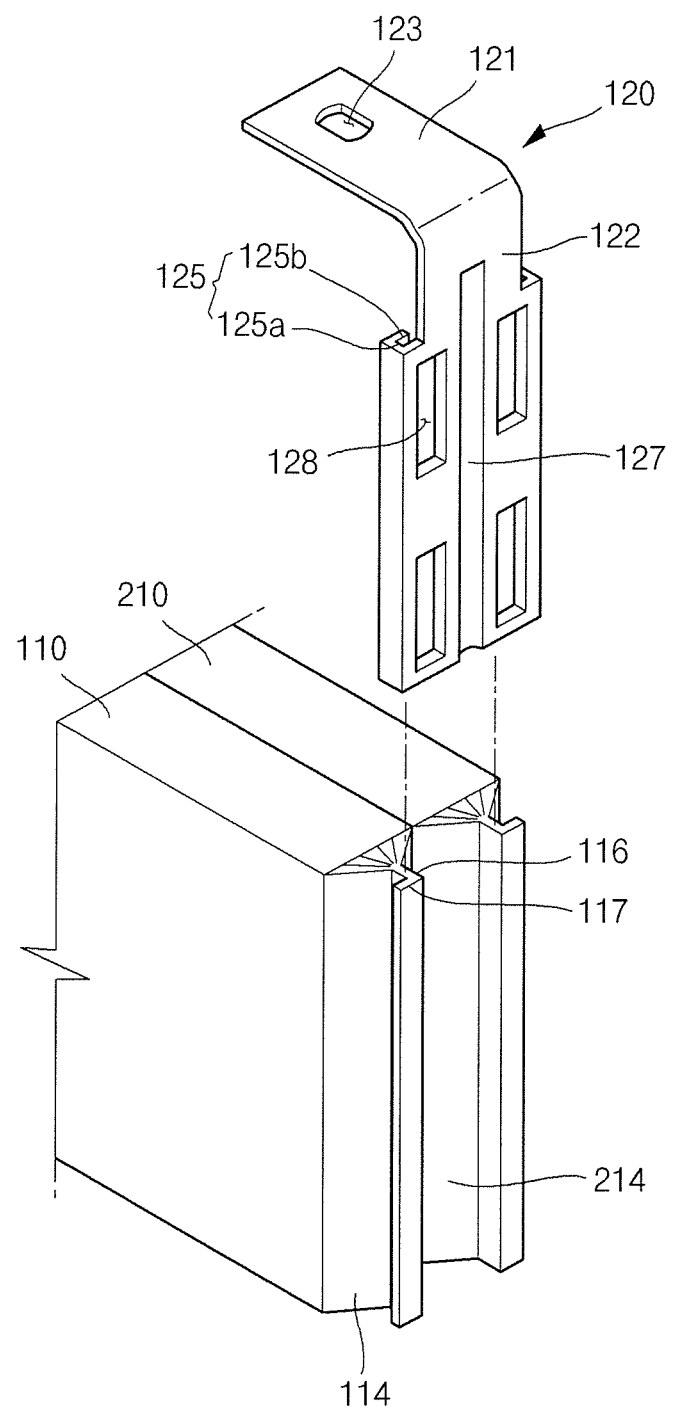
FIG. 4 is an exploded perspective view illustrating a portion of an electrode assembly and a collecting plate of the secondary battery illustrated FIG. 1.
Figure 5:
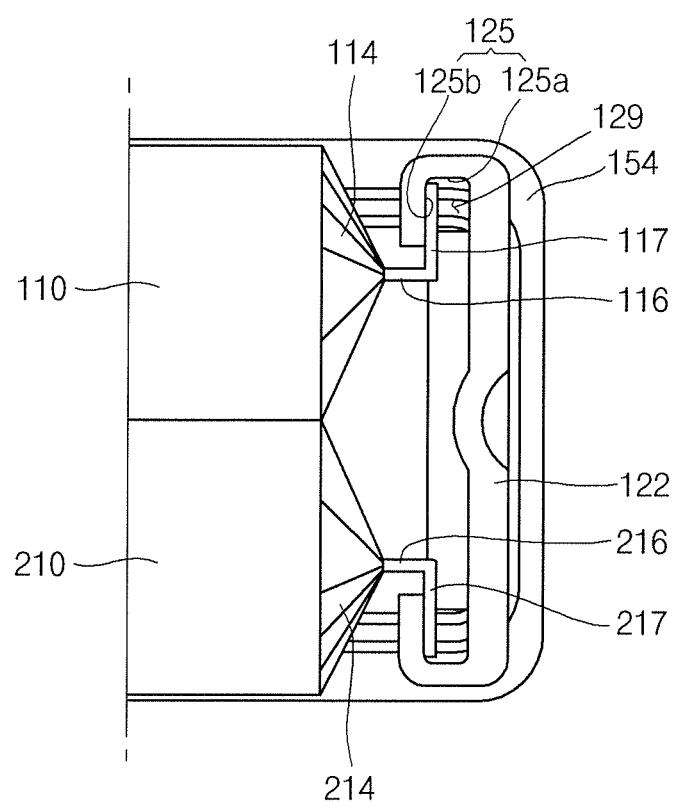
FIG. 5 is an enlarged bottom view illustrating a portion of the bottom of the secondary battery illustrated in FIG. 2.
Figure 6:
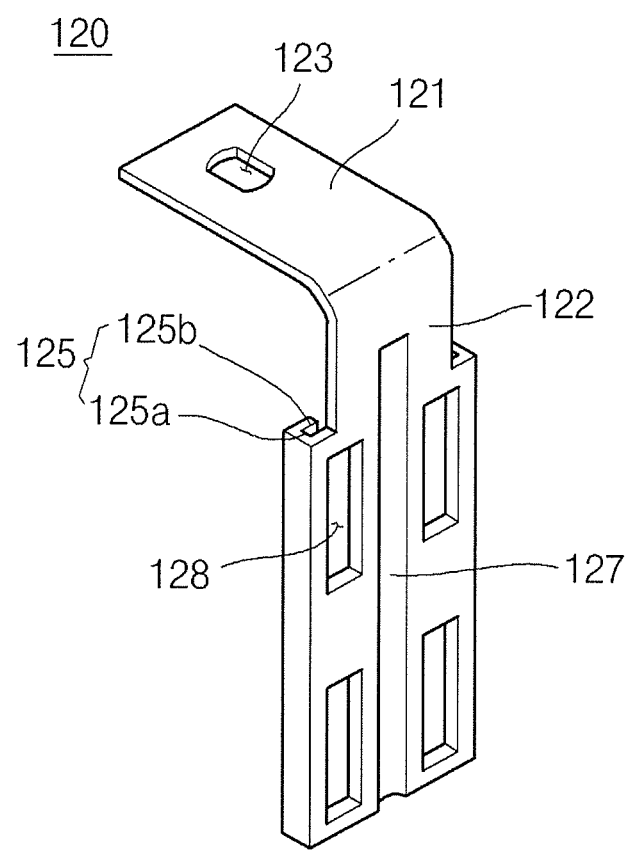
FIG. 6 is a perspective view illustrating the collecting plate illustrated in FIG. 4.
Figure 7:
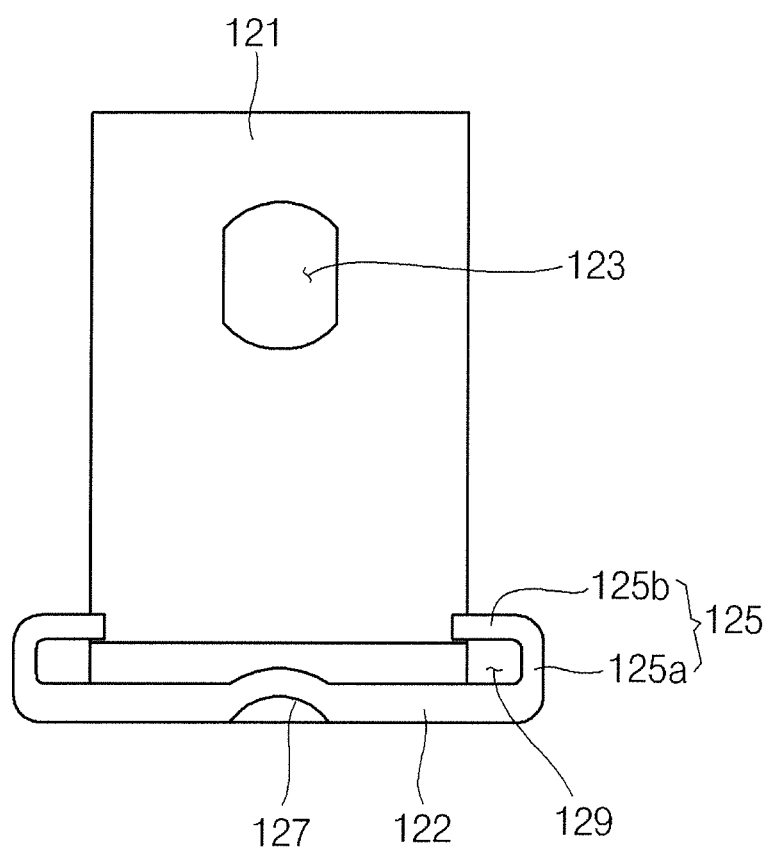
FIG. 7 is a bottom view illustrating the collecting plate illustrated in FIG. 4.

FIG. 1 is a perspective view illustrating a secondary battery according to an embodiment. FIG. 2 is a perspective view illustrating the secondary battery of FIG. 1 after removing a case from the secondary battery. FIG. 3 is a sectional view of FIG. 1. FIG. 4 is an exploded perspective view illustrating an electrode assembly and a collecting plate of the secondary battery illustrated FIG. 1. FIG. 5 is an enlarged bottom view illustrating a part of the bottom of the secondary battery illustrated in FIG. 2. FIG. 6 is a perspective view illustrating the collecting plate illustrated in FIG. 4. FIG. 7 is a bottom view illustrating the collecting plate illustrated in FIG. 4.

Referring to FIGS. 1 through 7, a secondary battery 100 of the current embodiment includes a first electrode assembly 110, a collecting plate 120, a case 140, and a cap assembly 150. The secondary battery 100 may further include a second electrode assembly 210 (FIG. 4). Hereinafter, a secondary battery 100 in which two electrode assemblies are accommodated will be described. However, embodiments are limited to the secondary battery 100 in which two electrode assemblies are accommodated.

The first electrode assembly 110 is formed by winding or stacking a first electrode plate 111, a separator 113, and a second electrode plate 112, all of which have a thin plate or film shape. The first electrode plate 111 may function as a negative electrode, and the second electrode plate 112 may function as a positive electrode. Alternatively, the first electrode plate 111 and the second electrode plate 112 may have opposite polarities. Both ends of the first electrode assembly 110 are coupled with first and second electrode terminals 152 and 153 that are electrically connected to the first and second electrode plates 111 and 112, respectively.

Substantially, the first electrode assembly 110 is accommodated in the case 140 together with electrolyte. The electrolyte may include an organic solvent such as ethylene carbonate (EC), propylene carbonate (PC), diethyl carbonate (DEC), ethyl methyl carbonate (EMC), and dimethyl carbonate (DMC); and a lithium salt such as $LiPF_6$ or $LiBF_4$. The electrolyte may be liquid, solid, or gel.

The first electrode plate 111 is formed by applying a first electrode active material such as graphite or carbon to a first electrode collector formed of metal foil such as copper or nickel foil. The first electrode plate 111 includes a first electrode non-coating portion 114 to which the first electrode active metal is not applied. The first electrode non-coating portion 114 functions as a current flow passage between the first electrode plate 111 and the outside of the first electrode plate 111. In the current embodiment, materials that can be used to form the first electrode plate 111 are not limited to the above-mentioned materials.

The second electrode plate 112 is formed by applying a second electrode active material such as a transition metal oxide to a second electrode collector formed of metal foil such as aluminum foil. The second electrode plate 112 includes a second electrode non-coating portion 115 to which the second electrode active metal is not applied. The second electrode non-coating portion 115 functions as a passage for a current between the second electrode plate 112 and the outside of the second electrode plate 112. In the current embodiment, materials that can be used to form the second electrode plate 112 are not limited to the above-mentioned materials.

The polarities of the first and second electrode plates 111 and 112 may be reversed with respect to each other.

The separator 113 is located between the first electrode plate 111 and the second electrode plate 112. The separator 113 prevents a short circuit and allows movement of lithium ions. The separator 113 may be formed of a polyethylene film or a film including polyethylene and polypropylene. In the current embodiment, materials that can be used to form the separator 113 are not limited to the above-mentioned materials.

The first electrode assembly 110 is formed by winding the first electrode plate 111, the separator 113, and the second electrode plate 112 in a manner such that the first and second electrode non-coating portions 114 and 115 protrude from upper and lower ends of the first electrode assembly 110. The first electrode plate 111, the separator 113, and the second electrode plate 112 of the first electrode assembly 110 may be wound in a vortex shape.

The first and second collecting plates 120 and 130 are coupled to both end parts of the first electrode assembly 110 in a manner such that the first and second collecting plates 120 and 130 are electrically connected to the first and second electrode plates 111 and 112, respectively.

The second electrode assembly 210 has substantially the same structure as the first electrode assembly 110. Thus, a detailed description of the second electrode assembly 210 will be omitted. The first and second non-coating portions of the second electrode assembly 210 are denoted by reference numerals 214 and 215, respectively.

The first collecting plate 120 includes a terminal coupling part 121 and a base 122. The first collecting plate 120 is formed of a metal or an equivalent thereof. For example, the first collecting plate 120 may be formed of copper or a copper alloy. However, the material of the first collecting plate 120 is not limited thereto. In detail, the first collecting plate 120 is approximately reverse L-shaped and includes the terminal coupling part 121, a bent part, and the base 122.

The terminal coupling part 121 includes a terminal hole 123. The first electrode terminal 152 is coupled to the terminal coupling part 121 by inserting the first electrode terminal 152 in the terminal hole 123. The terminal coupling part 121 is fixed to an insulator located on the bottom side of a cap plate 151 (described later). The terminal coupling part 121 is electrically insulated from the cap plate 151 and is bent from the base 122 at substantially a right angle.

The base 122 includes slide parts or tracks 125 and a plurality of penetration holes 128. The base 122 has a plate shape, and a groove 127 in a center region of the base 122.

In detail, the center part of the base 122 has a generally flat plate shape, and the slide parts 125 are located on either side of the base 122. Each of the slide parts 125 includes a first extension 125a and a second extension 125b, wherein the first extension 125a is generally perpendicular to the plate shape and the second extension 125b is generally perpendicular to the first extension 125a. The slide parts 125 form an open area 129 in their center and non-coating ends 117 and 217 of the first and second electrode assemblies 110 and 210 are inserted in the open area 129.

A plurality of first electrode non-coating portions 114 are bonded together by resistance welding (the bonded part is denoted by reference numeral 116), and the front end of the bonded part 116 is bent to form the non-coating end 117. The bent non-coating end 117 is inserted in the open area 129 and is coupled to the second extension 125b by resistance welding. Since the bent non-coating end 117 is coupled to the second extension 125b of the slide part 125 as described above, dead-space may be minimized in the secondary battery 100. Therefore, the size and weight of the secondary battery 100 can be minimized.

The penetration holes 128 are formed in a plurality of positions of the plate-shaped base 122, and in one embodiment, the penetration holes 128 are formed at positions generally corresponding to the non-coating end 117 inserted in the slide part 125. Due to the penetration holes 128, the non-coating end 117 and the second extension 125b may be easily welded together.

The second collecting plate 130 has substantially the same structure as the first collecting plate 120. Therefore, elements of the second collecting plate 130 will be denoted by the same reference numerals, and detailed descriptions thereof will be omitted.

The case 140 is formed of a conductive metal such as aluminum, aluminum alloy, or steel plated with nickel. The case 140 has an approximately hexahedral shape with an opening so that the first electrode assembly 110, the first collecting plate 120, and the second collecting plate 130 can be inserted and placed in the case 140. Although FIG. 2 shows a state where the case 140 is detached, the secondary battery 100 is sealed by coupling the cap assembly 150 to the opening of the case 140. The inner surface of the case 140 is treated to be electrically insulated from the first electrode assembly 110, the first electrode terminal 152, the second electrode terminal 153, and the cap assembly 150.

The cap assembly 150 includes the cap plate 151, gaskets 154, bolts 155, a plug 156, a safety vent 157, and insulation members.

The cap plate 151 of the cap assembly 150 is used to seal the case 140. The cap plate 151 includes a hole so that the first electrode terminal 152 connected to the first collecting plate 120 can be inserted through the cap plate 151. In addition, the cap plate 151 includes a hole so that the second electrode terminal 153 connected to the second collecting plate 130 can be inserted through the cap plate 151. The first and second electrode terminals 152 and 153 are insulated from the cap plate 151 by the gaskets 154. The first and second electrode terminals 152 and 153 may be threaded so that the first and second electrode terminals 152 and 153 can be coupled to the cap plate 151 by tightening the nuts 155 to the first and second electrode terminals 152 and 153. After electrolyte is injected through an electrolyte injection hole of the cap plate 151, the electrolyte injection hole is closed with the plug 156 of the cap assembly 150. The cap plate 151 may include the safety vent 157. The safety vent 157 is relatively thin, and thus if pressure increases to a set value, the safety vent 157 may be fractured to release gas.

The insulation members are located between the cap plate 151 and the first and second collecting plates 120 and 130 to prevent a short circuit. More specifically, the insulation members prevent a short circuit between the first collecting plate 120 and the cap plate 151 and a short circuit between the second collecting plate 130 and the cap plate 151. For example, the insulation members may be formed of polyphenylene sulfide (PPS). However, the current embodiment is not limited thereto.

As described above, according to the embodiment, the structure of the collecting plate is changed to minimize dead space in the secondary battery. Thus, the size and weight of the secondary battery can be minimized.

In addition, the non-coating portion of the electrode assembly is bent and inserted in the hole of the slide part for connection with the collecting plate. Due to this coupling structure of the non-coating portion and the collecting plate, dead space can be minimized in the secondary battery.

Exemplary embodiments of a secondary battery have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery comprising:
a wound electrode assembly comprising a first electrode plate having a non-coating portion, a second electrode plate having a non-coating portion, and a separator between the first electrode plate and the second electrode plate, wherein ends of the non-coating portion of the first electrode plate are combined together to form a single end portion having a first end portion extending in a first direction and a second end portion distal to the first end portion and extending in a second direction substantially perpendicular to the first direction and wherein ends of the non-coating portion of the second electrode plate are combined together to form a single end portion having a first end portion extending in the first direction and a second end portion distal to the first end portion extending in the second direction;
a collecting plate having a track accommodating and electrically coupled to the second end portion of one of the electrode plates wherein the second end portion is entirely spaced from one inner surface of the track, the collecting plate comprising a base and a terminal coupling part as a single integral component, wherein the terminal coupling part is directly coupled to an electrode terminal;
a case housing the electrode assembly and the collecting plate, the case comprising an upper opening; and
a cap assembly sealing the upper opening of the case.

2. The secondary battery as claimed in claim 1, wherein the non-coating portion comprises a bonded section where the ends of each respective non-coating portion are combined.

3. The secondary battery as claimed in claim 1, wherein the collecting plate has a generally planar surface that faces the non-coating portion of one of the electrode plates.

4. The secondary battery as claimed in claim 1, wherein the base has a generally planar surface that faces the non-coating portion of one of the electrode plates; and
wherein the collecting plate further comprises a first extension extending at substantially a right angle from an edge of the base and a second extension extending at substantially a right angle from the first extension, wherein the first extension and the second extension form the track.

5. The secondary battery as claimed in claim 4, wherein the non-coating portion of one of the electrode plates is coupled to the second extension.

6. The secondary battery as claimed in claim 5, wherein the collecting plate further comprises a plurality of penetration holes that generally correspond to the non-coating portion of one of the electrode plates.

7. The secondary battery as claimed in claim 1, wherein the collecting plate further comprises an opening, and wherein the electrode terminal is in the opening and electrically coupled to the collecting plate.

8. The secondary battery as claimed in claim 1, wherein the electrode assembly comprises two electrode assemblies oriented such that a planar surface of each of the two electrode assemblies face each other.

9. The secondary battery as claimed in claim 8, wherein the non-coating portion of the electrode plates of a first one of the electrode assemblies are oriented in a first direction and the non-coating portion of the electrode plates of a second one of the electrode assemblies are oriented in a second direction substantially opposite to the first direction.

10. The secondary battery as claimed in claim 9, wherein the non-coating portion of a plurality of the electrode plates is accommodated in the collecting plate.

11. The secondary battery as claimed in claim 10, wherein the base has a generally planar surface that faces the non-coating portion of one of the electrode plates; and
wherein the collecting plate further comprises a first extension extending at substantially a right angle from an edge of the base and a second extension extending at substantially a right angle from the first extension, wherein the first extension and the second extension form the track.

12. The secondary battery as claimed in claim 11, wherein each of the non-coating portion of one of the electrode plates is coupled to an inner surface of the second extension.

13. The secondary battery as claimed in claim 12, wherein the collecting plate has a plurality of penetration holes generally corresponding to the non-coating portion of one of the electrode plates.

14. The secondary battery as claimed in claim 8, wherein the non-coating portion of one of the electrode plates is coupled to the collecting plate, and an electrode terminal is in an opening of the collecting plate and electrically connected to the collecting plate.

\* \* \* \* \*